US008682274B2

(12) United States Patent
Sultenfuss et al.

(10) Patent No.: US 8,682,274 B2
(45) Date of Patent: *Mar. 25, 2014

(54) SYSTEM AND METHOD FOR RADIO ANTENNA SHARING IN AN INFORMATION HANDLING SYSTEM

(71) Applicant: Dell Products, LP, Round Rock, TX (US)

(72) Inventors: Andrew T. Sultenfuss, Leander, TX (US); James R. Utz, Round Rock, TX (US); Larry W. Finn, Georgetown, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/731,984

(22) Filed: Dec. 31, 2012

(65) Prior Publication Data

US 2013/0115896 A1 May 9, 2013

Related U.S. Application Data

(63) Continuation of application No. 12/505,220, filed on Jul. 17, 2009, now Pat. No. 8,369,811.

(51) Int. Cl.
*H04B 1/06* (2006.01)
*H01Q 21/28* (2006.01)
*H04B 7/08* (2006.01)

(52) U.S. Cl.
CPC .............. *H01Q 21/28* (2013.01); *H04B 7/0814* (2013.01)
USPC ...... 455/272; 455/277.1; 455/132; 455/553.1

(58) Field of Classification Search
USPC ........... 455/132, 133, 272, 277.1, 280, 552.1, 455/553.1
See application file for complete search history.

(56) References Cited

U.S. PATENT DOCUMENTS

| 6,411,825 | B1 * | 6/2002 | Csapo et al. ................. 455/561 |
| 6,735,663 | B2 * | 5/2004 | Watts et al. .................. 710/313 |
| 6,735,708 | B2 * | 5/2004 | Watts, Jr. ...................... 713/323 |
| 6,801,974 | B1 * | 10/2004 | Watts et al. .................. 710/303 |
| 6,816,925 | B2 * | 11/2004 | Watts, Jr. ........................ 710/36 |
| 6,826,391 | B2 * | 11/2004 | Leinonen et al. .......... 455/277.1 |
| 7,149,837 | B2 * | 12/2006 | Watts et al. .................. 710/303 |
| 7,197,584 | B2 * | 3/2007 | Huber et al. .................... 710/72 |
| 7,406,296 | B2 * | 7/2008 | Haartsen ..................... 455/41.2 |
| 7,636,560 | B2 * | 12/2009 | Ku ................................. 455/272 |
| 7,720,506 | B1 * | 5/2010 | Gribble ...................... 455/552.1 |
| 8,045,922 | B2 * | 10/2011 | Sherman et al. ............. 455/41.2 |
| 8,208,867 | B2 * | 6/2012 | Lum et al. ....................... 455/78 |
| 8,369,811 | B2 * | 2/2013 | Sultenfuss et al. ............ 455/272 |
| 2002/0103005 | A1 * | 8/2002 | Watts et al. ................... 455/556 |

(Continued)

*Primary Examiner* — Duc M Nguyen
(74) *Attorney, Agent, or Firm* — Larson Newman, LLP

(57) ABSTRACT

An information handling system includes a processing system with a radio output, another processing system with a radio output, and a radio selector operable to couple an antenna to a selected one of the radios. A radio selector board includes a radio, a selector switch with an input terminal coupled to the radio, another input terminal coupleable to another radio, a control input coupleable to a control module, and an output coupleable to an antenna. In response to a control signal from the control module, the selector switch connects the first radio to the antenna, and in response to another control signal, the selector switch connects the other radio to the antenna.

20 Claims, 3 Drawing Sheets

(56) References Cited

U.S. PATENT DOCUMENTS

| | | | |
|---|---|---|---|
| 2003/0176176 A1* | 9/2003 | Leinonen et al. | 455/277.1 |
| 2004/0063425 A1* | 4/2004 | Wakutsu et al. | 455/418 |
| 2004/0162107 A1* | 8/2004 | Klemetti et al. | 455/553.1 |
| 2004/0203709 A1* | 10/2004 | Luneau | 455/422.1 |
| 2006/0079275 A1* | 4/2006 | Ella et al. | 455/553.1 |
| 2007/0213105 A1* | 9/2007 | Huber et al. | 455/899 |

\* cited by examiner

SYSTEM AND METHOD FOR RADIO ANTENNA SHARING IN AN INFORMATION HANDLING SYSTEM

CROSS REFERENCE TO RELATED APPLICATIONS

This application is a continuation of U.S. patent application Ser. No. 12/505,220, entitled "System and Method for Radio Antenna Sharing in an Information Handling System," filed on Jul. 17, 2009, the disclosure of which is hereby expressly incorporated by reference in its entirety.

FIELD OF THE DISCLOSURE

This disclosure relates generally to information handling systems, and relates more particularly to wireless communication devices in an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are illustrated and described with respect to the drawings presented herein, in which.

The use of the same reference symbols in different drawings indicates similar or identical items.

DETAILED DESCRIPTION OF DRAWINGS

Figure 1:
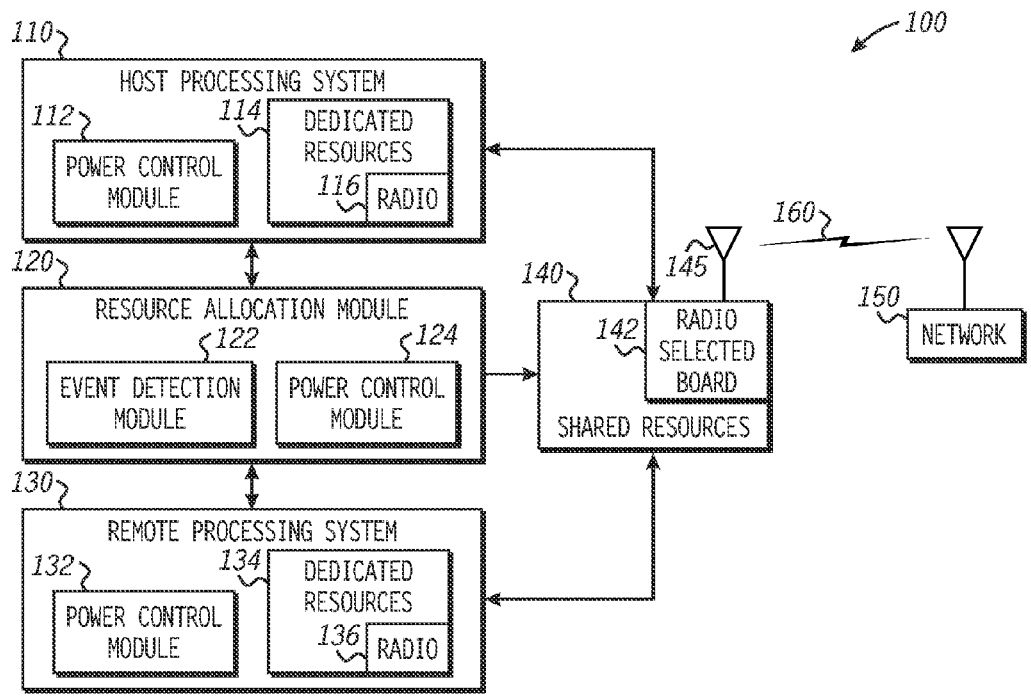
FIG. 1 is a functional block diagram of an information handling system according to an embodiment of the present disclosure.

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can be used in this application. The teachings can also be used in other applications, and with several different types of architectures, such as distributed computing architectures, client/server architectures, or middleware server architectures and associated resources.

For purposes of this disclosure, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

Portions of an information handling system, when referred to as a "device," a "module," or the like, can be configured as hardware, software (which can include firmware), or any combination thereof. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could be software, including firmware embedded at a device, such as a Pentium class or PowerPC™ brand processor, or other such device, or software capable of operating a relevant environment of the information handling system. The device could also be a combination of any of the foregoing examples of hardware or software. Note that an information handling system can include an integrated circuit or a board-level product having portions thereof that can also be any combination of hardware and software.

Devices or programs that are in communication with one another need not be in continuous communication with each other unless expressly specified otherwise. In addition, devices or programs that are in communication with one another may communicate directly or indirectly through one or more intermediaries.

An information handling system that includes a host processing system and a remote processing system can also include data communication radios that permit the information handling system to communicate wirelessly with a network. In a particular embodiment, described herein, the host processing system has an associated data communication radio, and the remote processing system has an associated data communication radio. The information handling system has one or more data communication radio antennas that can be shared among the data communication radios.

FIG. 1 illustrates an embodiment of an information handling system 100 according to an embodiment of the present disclosure, which is in communication with a network 150 via a wireless communication link 160. Information handling system 100 includes a host processing system 110, a resource allocation module 120, a remote processing system 130, and shared resources 140. Host processing system 110 and remote processing system 130 are each connected to resource allocation module 120, and to shared resources 140. Resource allocation module 120 is also connected to shared resources 140.

Host processing system 110 and remote processing system 130 are independent processing systems. An independent processing system is a system, such as a computer system, that is able to carry out tasks independently of other processing systems in an information handling system by independently controlling system resources including dedicated and shared resources. The tasks executed by each processing system are specified by software or firmware executing at the associated processing system. In a particular embodiment, host processing system 110 and remote processing system 130 each include an independent processor device (not illustrated), such as a central processing unit (CPU), and an input/output processing device, such as a chipset, and are each configured to operate independently of the other. Thus host processing system 110 and remote processing system 130 do not share tasks and each executes program threads from a different application program or operating system. In another embodiment, host processing system 110 and remote processing system 130 execute programs from a common application program or operating systems.

Host processing system 110 includes a power control module 112 and a set of dedicated resources 114. Similarly, remote processing system 130 includes a power control module 132 and a set of dedicated resources 134. Power control module 112 is configured to set the operational power mode for host processing system 110 and dedicated resources 114, and power control module 132 is configured to set the operational power mode for remote processing system 130 and dedicated resources 134. Thus, power control module 112 can set the operational power mode for host processing system 110 and dedicated resources 114, and power control module 132 can set the operational power mode for host processing system 130 and dedicated resources 134. An operational power mode refers to one of a plurality of potential power states during operation of the associated device. Thus, in different operational power modes, a device will typically consume different amounts of power, and have different functionality. Thus, for example, a particular device (not illustrated) of dedicated resources 114 can be set to an active power mode or to one or more low-power modes. In the active mode, the device executes designated operations at a relatively high speed and consumes a relatively large amount of power. In a first low-power mode, the device executes designated operations at a reduced rate of speed, and consumes a relatively small amount of power. In a second low-power mode, the device does not execute designated operations, but retains state information from the active mode and the first low-power mode, so that the device is able to execute the designated operations with the retained state information when the device returns to either the active mode or the first low-power mode.

In a particular embodiment, power control modules 112 and 132 set the power modes for the associated processing system 110 and 130, and for dedicated resources 114 and 134, independently. Thus, for example, power control module 132 can set the power mode of remote processing system 130 to a first power mode (such as an active mode) while setting the power mode of dedicated resources 134 to a second power mode (such as a low-power mode). Further, power control module 132 can set a particular device (not illustrated) of dedicated resources 134 to one power mode (such as a first low-power mode) and a second particular device of dedicated resources 134 to a second power mode (such as a second low-power mode). In another embodiment, host processing system 110 and the remote processing system 130 can each include multiple voltage rails (not illustrated) that are derived from a common power source, such as a battery. The power mode for a particular device can be set by connecting a power node of the device to a designated voltage rail.

Dedicated resources 114 and 134 and shared resources 140 each include one or more system resource. A system resource is a resource of information handling system 100 that is employed by processing systems 110 and 130 to perform a designated task. Examples of system resources include input/output devices, interface devices, memory devices, controller devices, and the like. Dedicated resources 114 and 134 each include one or more system resource that cannot be directly controlled by a processing system 110 or 130 other than the processing system 110 or 130 to which it is dedicated. For example, a particular device in dedicated resources 114 cannot be directly controlled by remote processing system 130, and another particular device in dedicated resources 134 cannot be directly controlled by host processing system 110. Shared resources 140 includes one or more system resource that can be controlled by either processing system 110 or 130. In a particular embodiment, one or more system resource is embodied in different semiconductor substrates. In the illustrated embodiment, dedicated resources 114 includes a data communication radio 116, and dedicated resources 134 includes a data communication radio 136. Shared resources 140 includes a radio selector board 142, and a data communication radio antenna 145.

Resource allocation module 120 includes an event detection module 122. Event detection module 122 is configured to detect an event at information handling system 100. An event includes an internal or external stimulus to information handling system 100. A non-limiting example of an event includes receiving a user input, or a communication from a network, including network 150, opening or closing of application software, or the like. In response to detecting an event, event detection module 122 accesses system state information indicating the state of host processing system 110 and of remote processing system 130. The state of processing systems 110 and 130 refers to the operational configuration at a particular point in time. In a particular embodiment, the state information of processing systems 110 and 130 includes information delineating the operating systems or applications being executed at each processing system 110 and 130, the power mode of processing systems 110 and 130 and of dedicated resources 114 and 134, the tasks being executed or scheduled for execution at processing systems 110 and 130, and the like. In response to detecting an event, event detection module 122 communicates event information indicating the event type and the system state information to the power control modules 112 and 132. The event type can include the source of the event, the timing of the event, or the like.

Resource allocation module 120 also includes a power control module 124. Power control module 124 stores a set of power profiles (not illustrated) and is configured to select one of the power profiles based on received event information. Based on the selected power profile, power control module 124 sets the power mode for any of shared resources 140, dedicated resources 114, and dedicated resources 134. To set the power mode for the system resources, power control module 124 communicates power control messages between host processing system 110 and remote processing system 130. Each power control message represents a request to set a power mode for a particular system resource or processing system. In a particular embodiment, in response to a power control message, power control module 124 directly sets a power mode for any of the dedicated resources 114, dedicated resources 134, and shared resources 140. In another embodiment, in response to a power control message, power control module 124 communicates messages to power control modules 112 and 132, as appropriate, to set each of dedicated resources 114 and 134, respectively, to the requested power mode.

In operation, when event detection module 122 detects an event, power control module 124 sets the power mode for one or more system resources. The operation can best be illustrated with the following example. Dedicated resources 114 can include a display device (not illustrated), and shared resources 140 can include a network interface device (not illustrated). Further, remote processing system 130 can interact with the network interface while host processing system 110 is in a low-power mode. When event detection module 122 detects an incoming message, such as an email message, at the network interface, event detection module 122 provides the event information to power control module 124. The event information can include the source and timing of the event, and the system state information. Based on the event information, power control module 124 selects a power profile that includes the desired power modes for dedicated resources 114, dedicated resources 134, and shared resources 140.

In a particular embodiment, power control module 124 can determine that, because host processing system 110 is in a low-power mode, host processing system 110 should not be placed in an active mode based on the incoming message, and dedicated resources 114, including the display device, should remain in the low-power mode. In another embodiment, power control module 124 can determine that the incoming message should be displayed immediately via the display interface. Accordingly, power control module 124 will communicate a message to power control module 112 to place the display interface in the active mode. Remote processing system 130 can then display the incoming message on the display interface.

In response to another event of a different type, power control module 124 can select a different power profile to maintain the display interface in the low-power state, while placing other system resources in an active state. For example, if the event is indicative of a low-battery condition or other loss of power, power control module 124 can place an audio interface (not illustrated) in shared resources 140 in an active state, while maintaining the display interface in a low-power state. A warning sound can then be played via the audio interface. Thus, power control module 124 can select a power profile, and therefore the power mode of each system resource, based on a type of event.

Further, power control module 124 can select a power profile based on the state of each processing system, as indicated by the system state information. For example, if an email message is received when the system state information indicates host processing system 110 is in a low-power state, power control module 124 can select a power profile so that an indicator light is placed in an active mode, to give an indication of a received message, while the visual display interface is left in low-power mode. However, if the system state information indicates host processing system 110 is in an active mode and is executing an email application, power control module 124 can keep the indicator light in the low-power mode, because the indication of the received email message will be displayed by the email application.

Thus power control module 124 selects the appropriate power profile based on the type of event indicated by event detection module 122, as well as the state of processing systems 110 and 130. The power profiles can be set so that only those system resources needed to service a designated event in a designated system state are placed in an active mode, thereby reducing overall power consumption of the information handling system 100.

Host processing system 110 and remote processing system 130 can each communicate with network 150. Thus, when host processing system 110 needs to send a data communication packet to network 150, or a data communication packet from network 150 is targeted to host processing system 110, event detection module 122 detects the event and resource allocation module 120 sends a control signal to shared resources 140, instructing radio selector board 142 to connect data communication radio 116 to data communication antenna 145. Once thus connected, the data communication packet is exchanged between host processing system 110 and network 150 via wireless communication link 160. Likewise, when remote processing system 130 needs to send a data communication packet to network 150, or a data communication packet from network 150 is targeted to remote processing system 130, event detection module 122 detects the event and resource allocation module 120 sends a control signal to shared resources 140, instructing radio selector board 142 to connect data communication radio 136 to data communication antenna 145, and the data communication packet is exchanged between remote processing system 130 and network 150 via wireless communication link 160.

Figure 2:
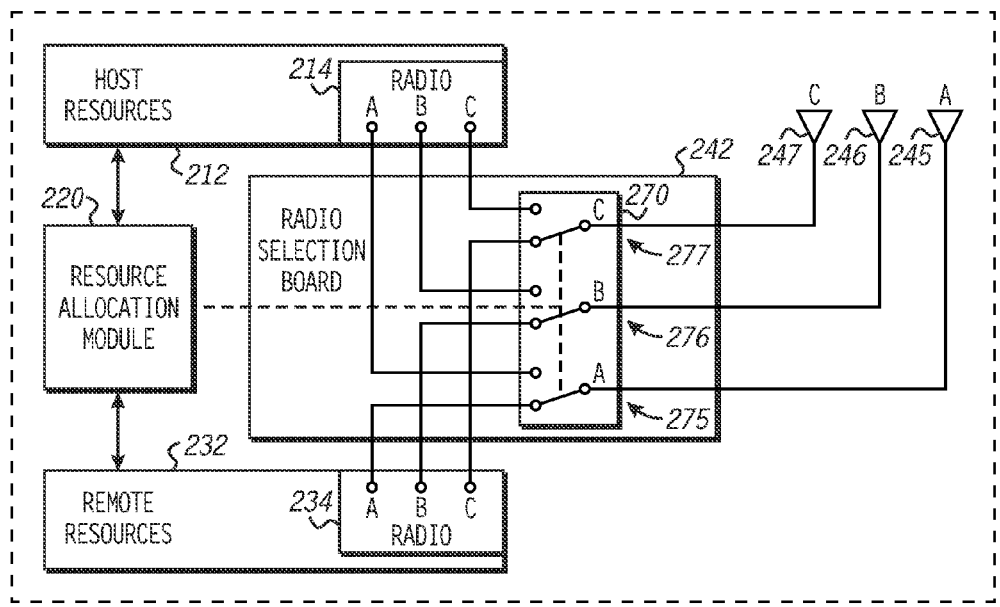
FIG. 2 is in part a functional block diagram and in part a schematic diagram of an embodiment of a radio subsystem in the information handling of FIG. 1.

FIG. 2 illustrates an embodiment of a radio subsystem 200 in an information handling system that is similar to information handling system 100 of FIG. 1. Radio subsystem 200 includes host resources 212 that are similar to dedicated resources 112, a resource allocation module 220 that is similar to resource allocation module 120, remote resources 232 that are similar to dedicated resources 132, a radio selector board 242 that is similar to radio selector board 142, and data communication antennas 245, 246, and 247, labeled "A," "B," and "C", respectively. Host resources 212 is associated with a host processing system (not illustrated), and remote resources 232 is associated with a remote processing system (not illustrated). As such, host resources 212 and remote resources 232 are each connected to resource allocation module 220.

Host resources 212 includes a data communication radio 214, and remote resources 232 includes a data communication radio 234. Data communication radios 214 and 234 each include three antenna connections labeled "A," "B," and "C", respectively. In an embodiment, data communication radios 214 and 234 are both data communication radios, which conform to the IEEE 802.11 "a", "b", "g", and "n" standards (hereinafter referred to as 802.11a, 802.11b, 802.11g, and 802.11n, respectively. As a particular example, the 802.11a, 802.11b, and 802.11g functionality can be defined by the IEEE 802.11-2007 revision, and the 802.11n functionality can be defined by the IEEE 802.11n Draft 2 revision. In another embodiment, data communication radios 214 and 234 are also data communication radios, which conform to the Bluetooth Special Interest Group specification (hereinafter referred to as the Bluetooth specification). As a particular example, the Bluetooth functionality can be defined by the Bluetooth Core Specification Version 3.0. Radio selector board 242 includes a source selector switch 270. Source selector switch 270 includes switches 275, 276, and 277, labeled "A," "B," and "C," respectively. Switches 275, 276, and 277 each operate as single-pole-double-throw (SPDT) switches. In a particular embodiment, switches 275, 276, and 277 are implemented as semiconductor devices on a substrate.

The A antenna connections of data communications radios 214 and 234 are connected to a first throw and a second throw of A switch 275, respectively, and A data communication antenna 245 is connected to the pole of A switch 275. Also, the B antenna connections of data communications radios 214 and 234 are connected to a first throw and a second throw of B switch 276, respectively, and B data communication antenna 246 is connected to the pole of B switch 276. Likewise, the C antenna connections of data communications radios 214 and 234 are connected to a first throw and a second throw of C switch 277, respectively, and C data communication antenna 247 is connected to the pole of C switch 277. Source selector switch 270 operates such that either data communication radio 214 is connected to data communication antennas 245, 246, and 247, or data communication radio 234 is connected to data communication antennas 245, 246, and 247. Thus, source selector switch 270 functions to select either data communication radio 214 or data communication radio 234 to send and receive data communication packets at a particular time.

Resource allocation module 220 is connected to radio selector board 242 so that, when host resources 212 need to send or receive a data communication packet, resource allocation module 220 sends a control signal to source selector switch 270, connecting the A, B, and C antenna connections of data communication radio 214 to antennas 245, 246, and 247, respectively. Likewise, when remote resources 232 need to send or receive a data communication packet, resource allocation module 220 sends a control signal to source selector switch 270, connecting the A, B, and C antenna connections of data communication radio 234 to antennas 245, 246, and 247, respectively. In this way, radio subsystem 200 is able to share antennas 245, 246, and 247 between host resources 212 and remote resources 232, and radio subsystem 200 can be more compact than topologies that do not share data communication antennas.

Figure 3:
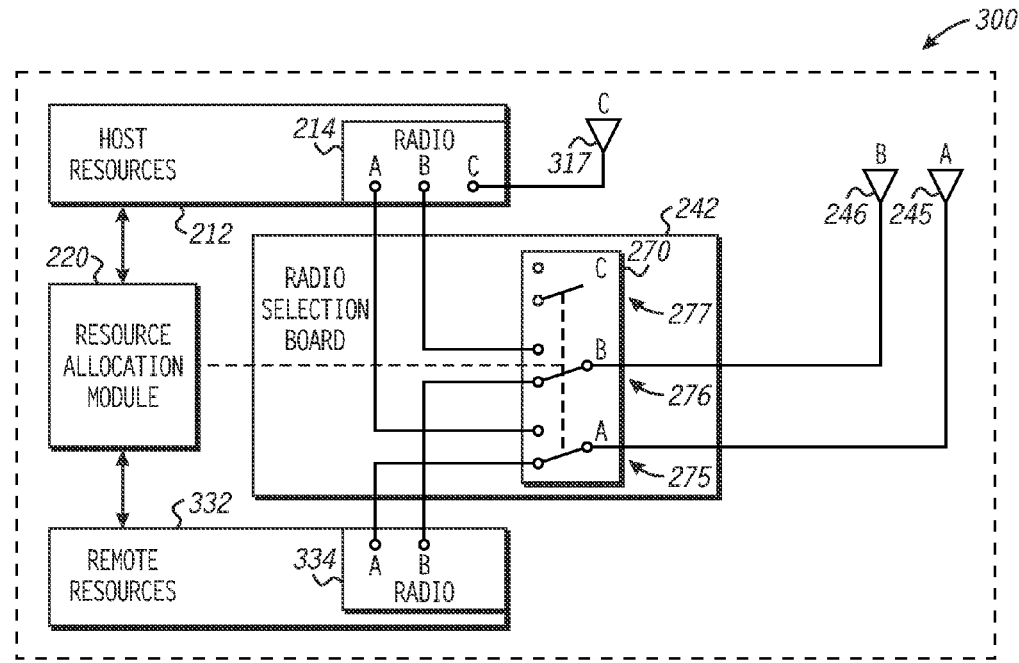
FIG. 3 is in part a functional block diagram and in part a schematic diagram of another embodiment of a radio subsystem in the information handling of FIG. 1.

FIG. 3 illustrates another embodiment of a radio subsystem 300 that is similar to radio subsystem 200 of FIG. 2. Radio subsystem 300 includes host resources 212, resource allocation module 220, radio selector board 242, and data communication antennas 245 and 246. Radio subsystem 300 also includes remote resources 332, and a data communication antenna 317. Host resources 212 is associated with a host processing system (not illustrated), and remote resources 332 is associated with a remote processing system (not illustrated). As such, host resources 212 and remote resources 332 are each connected to resource allocation module 220.

Host resources 212 includes data communication radio 214, and remote resources 332 includes a data communication radio 334. Data communication radio 334 includes two antenna connections labeled "A" and "B". In a particular embodiment, data communication radio 214 conforms to the IEEE 802.11a, b, g, and n standards and the Bluetooth specification, and data communication radio 334 conforms to the IEEE 802.11a, b and g standards and the Bluetooth specification. Radio selector board 242 includes source selector switch 270, and source selector switch 270 includes switches 275, 276, and 277.

In radio subsystem 300, the A and B antenna connections of data communications radios 214 and 234 are connected in the same way as in radio subsystem 200. In the embodiment illustrated in FIG. 3, however, the C antenna connection of data communications radio 214 is connected to data communication antenna 317. Thus, source selector switch 270 operates to connect either data communication radio 214 or data communication radio 334 to antennas 245 and 246. However, data communication radio 214 is connected directly to data communication antenna 317, and switch 277 is not used. In this way, for operation under the 802.11a, b, and g standards and the Bluetooth specification, source selector switch 270 functions to select either data communication radio 214 or data communication radio 234 to send and receive data communication packets at a particular time. For operation under the 802.11n standard, source selector switch 270 selects data communication radio 214 for data communication antennas 245 and 246, and data communication radio 214 retains its connection to data communication antenna 247.

Resource allocation module 220 is connected to radio selector board 242 so that, when host resources 212 need to send or receive a data communication packet, resource allocation module 220 sends a control signal to source selector switch 270, connecting the A and B antenna connections of data communication radio 214 to antennas 245 and 246. Likewise, when remote resources 332 need to send or receive a data communication packet, resource allocation module 220 sends a control signal to source selector switch 270, connecting the A and B antenna connections of data communication radio 334 to antennas 245 and 246. In this way, radio subsystem 300 is able to share antennas 245 and 246 between host resources 212 and remote resources 332, and data communication antenna 317 can be reserved for host resources 212. Also, radio subsystem 300 can be as compact as radio subsystem 200, but with one fewer antenna connection, making radio subsystem 300 easier to assemble. Furthermore, by reducing the functionality of radio 334 to exclude operation under 802.11n, radio subsystem 300 can use cheaper components that use less power than radio subsystem 200.

Figure 4:
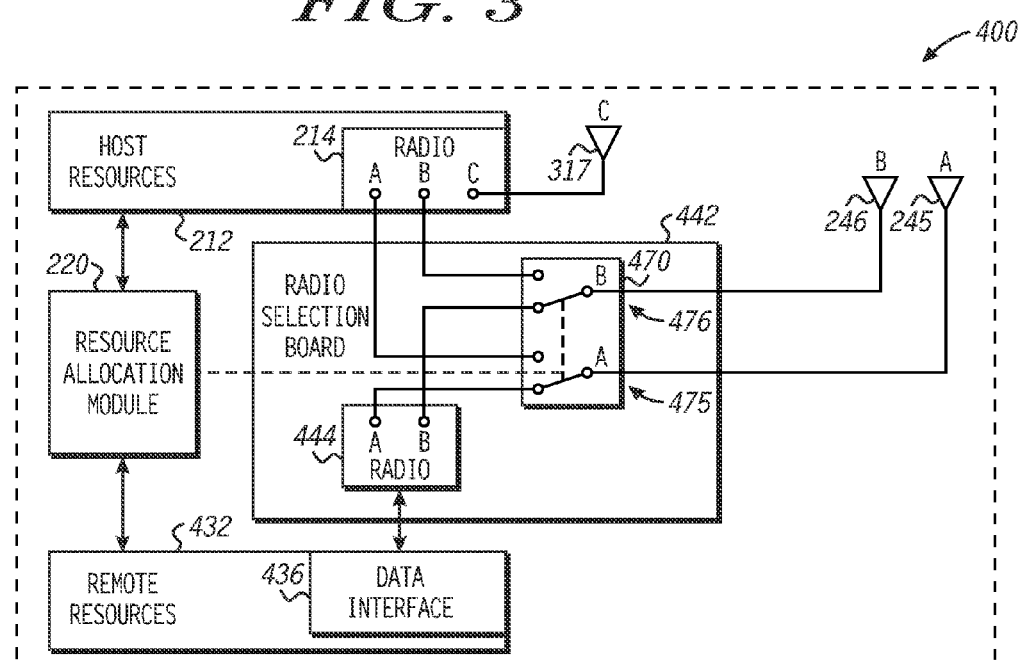
FIG. 4 is in part a functional block diagram and in part a schematic diagram of a different embodiment of a radio subsystem in the information handling of FIG. 1.

FIG. 4 illustrates another embodiment of a radio subsystem 400 that is similar to radio subsystem 200 of FIG. 2, and to radio subsystem 300 of FIG. 3. Radio subsystem 400 includes host resources 212, resource allocation module 220, and data communication antennas 245, 246, and 317. Radio subsystem 400 also includes remote resources 432, and a radio selector board 442. Host resources 212 is associated with a host processing system (not illustrated), and remote resources 432 is associated with a remote processing system (not illustrated). As such, host resources 212 and remote resources 432 are each connected to resource allocation module 220.

Host resources 212 includes data communication radio 214, and remote resources 432 includes a data interface 436. Radio selector board 442 includes a data communication radio 444, and a source selector switch 470. Data interface 436 is connected to data communication radio 444. Data communication radio 444 includes two antenna connections labeled "A" and "B". In a particular embodiment, data communication radio 214 conforms to the IEEE 802.11a, b, g, and n standards and the Bluetooth specification, and data communication radio 444 conforms to the IEEE 802.11a, b and g standards and the Bluetooth specification. Source selector switch 470 includes switches 475 and 476, labeled "A," and "B," respectively. Switches 475 and 276 each operate as single-pole-double-throw (SPDT) switches. In a particular embodiment, switches 475 and 476 are implemented as semiconductor devices on a substrate.

The A antenna connections of data communications radios 214 and 444 are connected to a first throw and a second throw of A switch 475, respectively, and A data communication antenna 245 is connected to the pole of A switch 475. Also, the B antenna connections of data communications radios 214 and 444 are connected to a first throw and a second throw of B switch 476, respectively, and B data communication antenna 246 is connected to the pole of B switch 476. The C antenna connection of data communications radio 214 is connected data communication antenna 317. Source selector switch 470 operates such that either data communication radio 214 is connected to data communication antennas 245 and 246, or data communication radio 444 is connected to data communication antennas 245 and 246. Thus, source selector switch 470 operates to connect either data communication radio 214 or data communication radio 444 to antennas 245 and 246. However, data communication radio 214 is connected directly to data communication antenna 317. In this way, for operation under the 802.11a, b, and g standards and the Bluetooth specification, source selector switch 470 functions to select either data communication radio 214 or data communication radio 444 to send and receive data communication packets at a particular time. For operation under the 802.11n standard, source selector switch 470 selects data communication radio 214 for data communication antennas 245 and 246, and data communication radio 214 retains its connection to data communication antenna 247.

Resource allocation module 220 is connected to radio selector board 442 so that, when host resources 212 need to send or receive a data communication packet, resource allocation module 220 sends a control signal to source selector switch 470, connecting the A and B antenna connections of data communication radio 214 to antennas 245 and 246. Likewise, when remote resources 432 need to send or receive a data communication packet, resource allocation module 220 sends a control signal to source selector switch 470, connecting the A and B antenna connections of data communication radio 444 to antennas 245 and 24. In the embodiment illustrated in FIG. 4, however, remote resources 432 sends or receives data through data interface 436, and the data communication radio 444 is collocated on radio selector board 442. In this way, radio subsystem 400 is able to share antennas 245 and 246 between host resources 212 and remote resources 432, and data communication antenna 317 can be reserved for host resources 212. Also, radio subsystem 400 can be more compact and easier to assemble than radio subsystems 200 and 300. This is because the connections between data communication radio 444 and selector switch 470 can be integrated into radio selector board 442, thus necessitating no separate antenna connections between data communication radio 444 and selector switch 470. Furthermore, by reducing the functionality of radio 444 to exclude operation under 802.11n, radio subsystem 400 can be cheaper and use less power.

Figure 5:
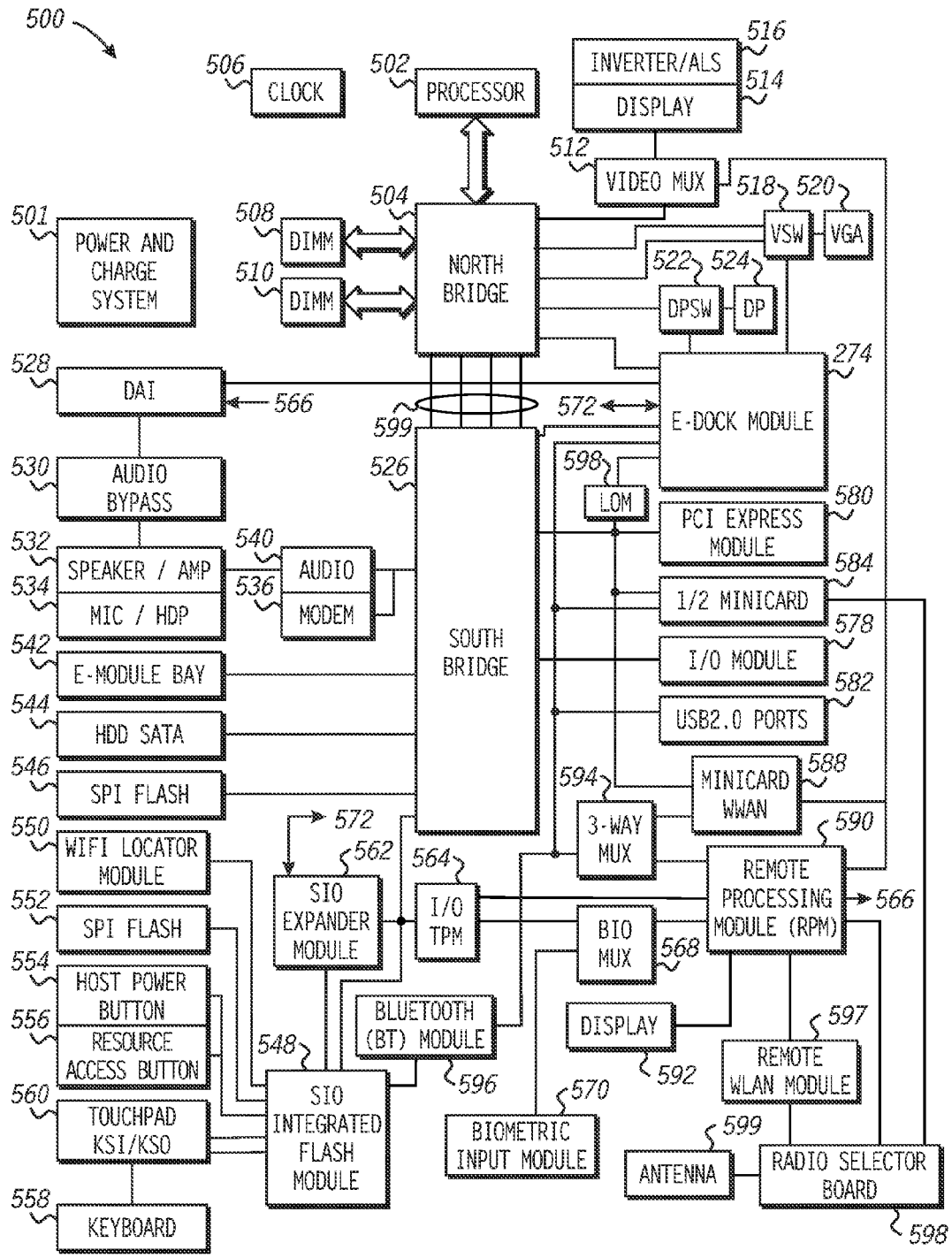
FIG. 5 is a functional block diagram of an information handling system similar to the information handling system of FIG. 1.

FIG. 5 illustrates a functional block diagram of an information handling system 500 similar to information handling system 100 and that includes a processor 502 coupled to a north bridge 504. Processor 502 can be realized as host processing system 110 as described in FIG. 1, or any other module operable as needed or desired. A clock 506 outputs a timing signal to processor 502 and other components or resources of information handling system 500 as needed or required. North bridge 504 is further coupled to a dual in-line memory module (DIMM) 508 and a DIMM 510. North bridge 504 is also coupled to a video multiplexer (Video MUX) 512 operable to multiplex and output video signals to be displayed using a display 514. Display 514 includes an inverter and automatic light sensor (ALS) module 516. North bridge 504 is further coupled to a video switch (VSW) module 518 and a video graphics array (VGA) port 520. A display port (DP) 524 is coupled to a display port switch (DPSW) 522 operable to be coupled to north bridge 504, and an E-Dock module 574. E-Dock module 574 is used to expand resources of information handling system 500, and in various forms, to enable access to a battery or charge source, a media slice, an I/O box, a printer interface, or various other resources that can be accessed when docking information handling system 500 to a docking module.

Information handling system 500 also includes a south bridge 526 coupled to north bridge 504 using a data bus 599. A digital audio interface (DAI) module 528 receives a digital audio signal from an input source 566. A remote processing module (RPM) 590 or other modules are coupled to DAI 528 to input a digital audio signal as input source 566. For example, DAI module 528 can also be coupled to E-Dock module 574. An audio bypass 530 is further coupled to a speaker and amplifier 532, and a microphone and headphone (MIC/HDP) 534. South bridge 526 is also coupled to a modem 536 such as an RJ-11 or plain old telephone system (POTS) enabled modem, and an audio output module 540 operable to couple audio output signals using south bridge 526.

South bridge 526 is coupled to an E-Module bay 542 which can include a bay or cavity that is used to couple and decouple resources that access an internal bus of information handling system 500. For example, E-Module bay 542 can be coupled to south bridge 526 using a multiplexer such as 3-way Mux 594 operable to couple a resource coupled to E-Module bay 542. Examples of resources include disk drives, optical drives, batteries, I/O expander modules, smart card readers, and various combinations thereof. Information handling system 500 further includes a serial advanced technology attachment hard disk drive (SATA HDD) 544, and a serial peripheral interface (SPI) flash memory 546. South bridge 526 is also coupled to a serial I/O (SIO) integrated flash module 548. SIO integrated flash module 548 is coupled to a wireless fidelity (WIFI) locator module 550 which can refer to any type of 802.11x or any other short-range wireless communication. SIO integrated flash module 548 is also coupled to an SPI flash module 552, a host power button 554, and a resource access button interface 556 that can include one or more resource access buttons. SIO integrated flash module 548 is also coupled to a keyboard 558 and touchpad and KSI/KSO module 560. An SIO expander module 562 is also coupled to SIO integrated flash module 548 and is further coupled to an I/O trusted platform module (TPM) 564. I/O TPM 564 is further coupled to a biometric multiplexer (BIO MUX) 568, and a biometric input 570 operable to detect user biometrics (e.g. fingerprints, face recognition, iris detection, EKG/heart monitor, etc.). In other forms, information handling system 500 can also include a security engine (not illustrated) that is coupled to biometric input 570 using RPM 590 to enable and disable access to portions or all of information handling system 500.

E-Dock module 574 is also coupled to SIO integrated flash module 548 and SIO expander module 562 via interface 572. South bridge 526 is further coupled to an I/O module 578, and a peripheral computer interconnect (PCI) express module 580 using a PCI express bus. South bridge 526 is further coupled to a universal serial bus (USB) 5.0 access ports 582 via a host USB bus. A ½ Mini Card module 584 and a Minicard wireless wide area network (WWAN) module 588 are also coupled to south bridge 526 using a PCI express bus. In a particular embodiment, ½ Mini Card module 584 includes a wireless wide-area network (WWAN) card similar to radios 116 and 214.

RPM 590 is coupled to a display 592. RPM 590 can be realized as remote processing system 130 as described in FIG. 1, or any other module operable as needed or desired. RPM 590 can further be configured to output a video signal to the video MUX 512 to output to the display 514. RPM 590 is also coupled to a three (3) way multiplexer 594. 3-way multiplexer 594 multiplexes USB signals from Minicard WWAN 588, RPM 590, and other USB devices (not illustrated) coupled to south bridge 504. South bridge 526 is further coupled to a Bluetooth (BT) module 596 via the USB bus. South bridge 526 is also coupled to a local area network (LAN) on Motherboard (LOM) 598 via a PCI express bus of information handling system 500. LOM 598 is also coupled to PCI express module 580. Information handling system 500 also includes a power and charge system 501 operable to distribute power to the components of information handling system 500, and to charge rechargeable power sources of information handling system 500.

Information handling system 500 includes a remote wireless local-area network (WLAN) module 597 that is connected to RPM 590. Remote WLAN module 597 can include radios similar to radios 136, 234, 334, and 444. ½ Mini Card module 584 and remote WLAN module 597 include radio signal outputs that are connected to a radio selector board 598. Radio selector board 598 can be similar to radio selector boards 142, 242, and 442. Radio selector board 598 is also connected to RPM 590 to receive control signals to select either the radio signal output of ½ Mini Card module 584 or the radio signal output of remote WLAN module 597, and connects the selected radio output signal to antenna 599.

In operation, RPM 590 is configured to detect a user initiated event, a non-user initiated event, network events, clock events, location events, timer events, power events, or any combination thereof. For example, a user initiated event can include a user activating a key, button, or other type of hardware, software, or user selectable interface, or combinations thereof, that can generate a user activated event. Thus, a user can select a button to access a messaging application of information handling system 500. As such, RPM 590 detects a request to access the messaging application and RPM 590 initiates access to resources of information handling system 500 during a reduced operating state of information handling system 500.

RPM 590 also detects non-user initiated events. For example, information handling system 500 can employ Minicard WWAN 588 to receive communication signals via a wireless communication. Minicard WWAN 588 detects the non-user initiated event. For example, a software update can be received and an update can be initiated without user intervention. In another form, an auto-power off feature can be used with a GPS feature of Minicard WWAN 588. Control module 548, RPM 590, or any combination thereof, identifies a resource profile (not illustrated) of the detected event, and initiates activation of resources of information handling system 500 to process the non-user initiated event. According to a further aspect, non-user initiated events, user initiated events, or any combination thereof can be detected. In response to an event, RPM 590, control module 548, or any combination thereof, then initiates placement of resources into designated power modes based on the event. Thus, the power mode for each resource can vary in response to different kind of events. As such, information handling system 500 need not be initialized to process all events, and a limited amount of resources can be activated.

Information handling system 500 further detects non-user initiated events communicated to electronic devices other than information handling system 500 during a reduced operating state of information handling system 500. For example, RPM 590 can be configured to detect a message formatted to be received by a smart phone device, Blackberry device, or any type of electronic device configured to receive messages. Thus, information handling system 500 can employ Minicard WWAN 588 to detect wireless messages communicated via any network operable to communicate messages, such as a wireless messaging network, an SMS network, Blackberry enabled network, or any other type of messaging enabled wireless or wireline network. In another form, the RPM 590 can be wirelessly enabled to receive and transmit wireless communication signals. As such, Minicard WWAN 588 may not be enabled to receive wireless communications.

Information handling system 500 also operates in a low-power mode that includes sufficient resources to detect a wireless signal. As such, RPM 590 can determine a current operating state of information handling system 500, and initiate placing resources in an appropriate power mode to process and output a response to the received wireless signal. As such, an operating environment to output a response to a message, such as a Blackberry message, can be enabled using a limited amount of resources without having to initialize additional resources of information handling system 500. For example, RPM 590 in combination with control 548 can be used to place display 514 in an appropriate power mode to output a received message. Additionally, keyboard 558 or other input devices of information handling system 500 can be placed in an active mode to enable a user to view and respond to a message. As such, a limited resource operating environment can be generated to enable receipt and response to messages without having to initialize information handling system 500. In this manner, information handling system 500 can be realized as a laptop or notebook system that is used to receive messages intended for a Blackberry or other type of messaging device as desired.

In the embodiments described above, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described above can be configured as hardware, software (which can include firmware), or any combination thereof. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could be software, including firmware embedded at a device, such as a Pentium class or PowerPC™ brand processor, or other such device, or software capable of operating a relevant environment of the information handling system. The device could also be a combination of any of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
coupling a first radio associated with a first processing system of an information handling system to a first switch of a radio selector board, wherein the first processing system is operable to control the first radio;
coupling a second processing system to a second radio of the radio selector board, wherein the second radio is associated with the second processing system, and wherein the second processing system is operable to control the second radio;
coupling the second radio to the first switch;
coupling a first antenna to the first switch;
in response to operating the first processing system in a first low-power mode, connecting the second radio to the first antenna; and
in response to operating the second processing system in a second low-power mode, connecting the first radio to the first antenna.

2. The method of claim 1, further comprising:
coupling the first radio to a second switch;
coupling the second radio to the second switch;
coupling a second antenna to the second switch;
in response to operating the first processing system in the first low-power mode, connecting the second radio to the second antenna; and
in response to operating the second processing system in a second low-power mode, connecting the first radio to second antenna.

3. The method of claim 2, wherein the first switch and the second switch comprise semiconductor devices.

4. The method of claim 1, further comprising:
coupling an allocator to the first processing system, the second processing system, and the radio selector; and
controlling by the allocator the radio selector to couple the first antenna to the selected one of the first radio or the second radio.

5. The method of claim 4, further comprising:
selecting by the allocator to operate the second processing system in the second low-power mode when the first antenna is coupled to the first radio; and
selecting by the allocator to operate the first processing system in the first low-power mode when the first antenna is coupled to the second radio.

6. The method of claim 5, wherein the allocator operates to control the radio selector in response to an event at the information handling system.

7. The method of claim 6, wherein the event includes an input from a user of the information handling system.

8. The method of claim 1, wherein the radio selector includes the second radio.

9. The method of claim 1, wherein the first radio operates as an 802.11n compliant radio, and the second radio operates as an 802.11g compliant radio.

10. An information handling system comprising:
a first processing system including a first processor and a first radio, wherein the first processor is operable to control the first radio;
a second processing system including a second processor and a radio data interface, wherein the second processor is operable to control a second radio; and
a radio selector board including the second radio and a radio selector, wherein the second radio is coupled to the radio data interface and the radio selector is coupled to:
the first radio;
the second radio; and
a first antenna;
wherein the radio selector is operable to couple the first antenna to a selected one of the first radio or the second radio.

11. The information handling system of claim 10, wherein:
the first radio includes a first output and a second output;
the second radio includes a third output and a fourth output;
the radio selector includes a first switch and a second switch; and
the first antenna includes a first element and a second element; and wherein:
the first switch is coupled to the first output, the third output, and the first element; and
the second switch is coupled to the second output, the fourth output, and the second element; and
the radio selector is operable to couple the first element to a selected one of the first output or the third output, and to couple the second element to a selected one of the second output or the fourth output.

12. The information handling system of claim 11, wherein the first switch and the second switch comprise semiconductor devices.

13. The information handling system of claim 11, further comprising:
a second antenna; and
wherein the first radio includes a fifth output coupled to the second antenna.

14. The information handling system of claim 10, wherein the first radio operates as an 802.11n compliant radio, and the second radio operates as an 802.11g compliant radio.

15. The information handling system of claim 10, further comprising an allocator operatively coupled to the first processing system, the second processing system, and the radio selector, wherein the allocator operates to control the radio selector to couple the first antenna to the selected one of the first radio or the second radio.

16. The information handling system of claim 15, wherein the allocator is further operable to:
operate the second processing system in a low-power mode when the first antenna is coupled to the first radio; and
operate the first processing system in a low-power mode when the first antenna is coupled to the second radio.

17. A non-transitory computer-readable medium including code for carrying out a method, the method comprising:
coupling a first radio associated with a first processing system of an information handling system to a first switch of a radio selector board, wherein the first processing system is operable to control the first radio;
coupling a second processing system to a second radio of the radio selector board, wherein the second radio is associated with the second processing system, and wherein the second processing system is operable to control the second radio;
coupling the second radio to the first switch;
coupling a first antenna to the first switch;
in response to operating the first processing system in a first low-power mode, connecting the second radio to the first antenna; and
in response to operating the second processing system in a second low-power mode, connecting the first radio to the first antenna.

18. The computer-readable medium of claim 17, the method further comprising:
coupling the first radio to a second switch;
coupling the second radio to the second switch;
coupling a second antenna to the second switch;
in response to operating the first processing system in the first low-power mode, connecting the second radio to the second antenna; and
in response to operating the second processing system in a second low-power mode, connecting the first radio to second antenna.

19. The computer-readable medium of claim 17, the method further comprising:
coupling an allocator to the first processing system, the second processing system, and the radio selector; and
controlling by the allocator the radio selector to couple the first antenna to the selected one of the first radio or the second radio.

20. The computer-readable medium of claim 19, the method further comprising:
selecting by the allocator to operate the second processing system in the second low-power mode when the first antenna is coupled to the first radio; and
selecting by the allocator to operate the first processing system in the first low-power mode when the first antenna is coupled to the second radio.

* * * * *